Sept. 30, 1958     E. LANTERMANN     2,854,212

TURBINE APPARATUS

Filed July 16, 1956

*Inventor,*
ERNST LANTERMANN, DECEASED
BY HELENE LANTERMANN,
ADMINISTRATRIX

BY Ralph T. Brunel

ATTORNEY

United States Patent Office 2,854,212
Patented Sept. 30, 1958

2,854,212

TURBINE APPARATUS

Ernst Lantermann, deceased, late of Mulheim, Ruhr, Germany, by Helene Lantermann, administrator/executor, Mulheim, Ruhr, Germany, assignor to Siemens-Schuckertwerke Aktiengesellschaft, Erlangen, Germany, a corporation of Germany Application July 16, 1956, Serial No. 598,046

Claims priority, application Germany July 19, 1955

6 Claims. (Cl. 253—78)

This invention relates to elastic fluid turbine casing structure and more particularly to a means for fixedly securing to each other two elements of a turbine casing, namely, the stationary blade component and the casing.

Turbines which utilize an outer casing and an inner casing may be provided with a separate stationary blade component. It is an object of this invention to provide a means for fixedly securing the stationary blade component to the inner casing, thereby facilitating assembly and disassembly of the unit.

It has been found that after the turbine has been running a substantial period of time, rusting and encrustation with consequent binding usually occurs between the stationary blade component and the means for securing it to the casing, thereby rendering it difficult and expensive to separate the two parts. Therefore, it is a further object of this invention to provide securing means which may be easily removed after the turbine has been running a substantial period of time.

One embodiment of the present invention provides female threads at one end portion of an annular undivided inner casing. The inner casing is provided with an inwardly extending wall against which abuts an axially undivided intermediate member, which is rigidly secured to an axially divided stationary blade holder. A ring provided with male threads is screwed into the female threads of the inner casing so that the intermediate member is fixedly secured between the ring and the wall of the inner casing. The threads of the ring and casing are constructed with sufficient backlash to facilitate assembly and disassembly. Also, the threads of both ring member and casing member are provided with a plurality of pairs of mating grooves constructed so that the threads of one member overlap those of the other member in such a manner that a wedge member may be inserted into one pair of grooves to tighten or into another pair of grooves to loosen the ring.

These and other objects are effected by the invention as will be apparent from the following description and claims taken in connection with the accompanying drawings, forming a part of this application, in which:

Figures 4, 5:
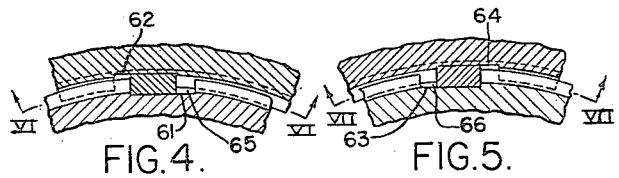
Figures 6, 7:
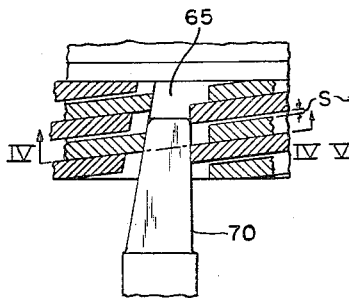

Figs. 4 and 5 are sectional views taken along the lines IV—IV of Fig. 6 and V—V of Fig. 7, respectively, looking in the direction indicated by the arrows and showing the mating threads in the vicinity of the pairs of grooves for loosening and tightening, respectively, the ring; and, Figs. 6 and 7 are longitudinal sectional views taken along the lines VI—VI of Fig. 4 and VII—VII of Fig. 5, respectively, looking in the direction of the arrows.

Figure 1:
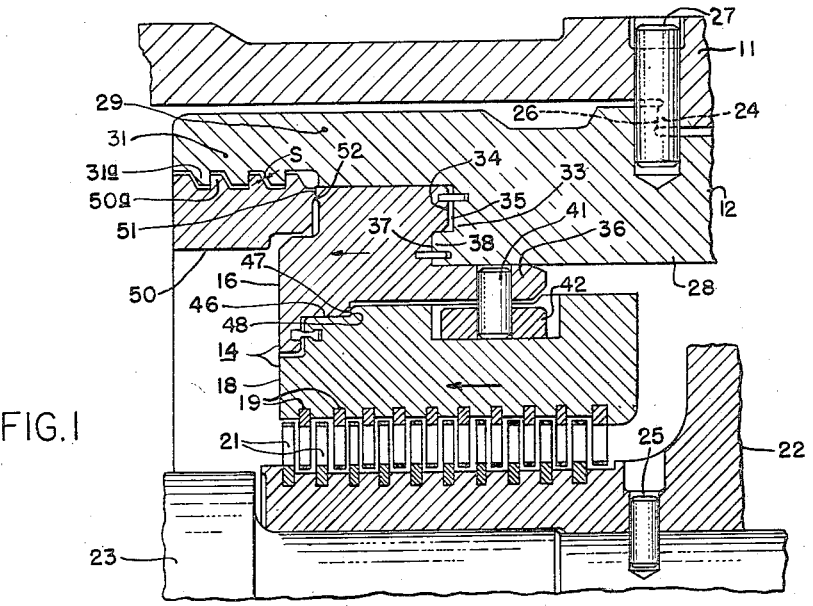
Fig. 1 is a fragmentary longitudinal sectional view of a turbine whose outer and inner casings are undivided axially and which embodies the present invention.
Figures 2, 3:
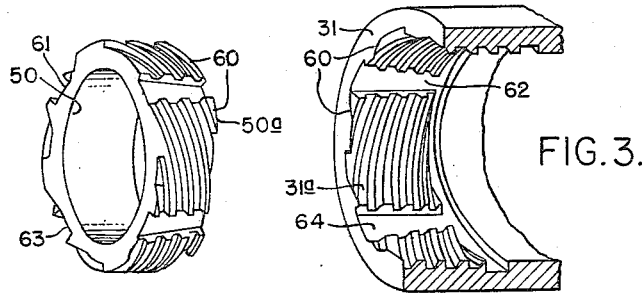
Fig. 2 is a perspective view of the securing ring.
Fig. 3 is a perspective view of a portion of the inner casing.

Referring to the drawing, particularly Fig. 1, a portion of a typical axial flow turbine is shown. The turbine shown in Fig. 1 is similar to that illustrated in Patent 2,781,999 entitled "Turbine Construction" S. N. 532,927 filed by Carl Brenecke and assigned to the assignee of the present invention.

The turbine is provided with an axially undivided annular outer casing 11 and an axially undivided annular inner casing 12, which supports a stationary blade component 14.

The stationary blade component 14 comprises an axially undivided annular member 16 which is positioned between the inner casing 12 and an axially divided stationary blade holder 18 and therefore is hereinafter designated as intermediate member 16.

The stationary blade holder 18 supports a plurality of stationary blades 19 cooperating with a plurality of rotating blades 21 supported by a rotating blade holder 22. The rotating blade holder 22 is secured to a rotor 23 by a plurality of radially extending pins 25 which serve to axially locate the rotating blade holder and to transmit torque therefrom to the rotor.

The outer casing 11 is provided with a radially inwardly extending shoulder 24 and the inner casing 12 is provided with a radially outwardly extending projection 26 constructed to abut the shoulder 24 when the inner casing is in assembled position, and secured in axial position by pins 27.

The inner casing, as shown in Fig. 1, consists of a body portion 28 having an annular projection 29 extending axially to the left as viewed in Fig. 1. A portion or restraining means 31 of the projection 29, farthest to the left, as viewed in the drawing, is provided with female threads 31a as hereinafter described. Axially positioned between the threaded portion and the body portion is the intermediate member 16 which supports the axially divided stationary blade holder 18. The intermediate member 16 is an axially unidivided ring, and is provided on its right hand side near the outer circumference with an annular tongue or projection 34 extending to the right, which fits in a suitable groove 35 provided on an inwardly extending wall 33 of the inner casing. The groove 35 which is provided for the projection 34 is of greater axial length than the projection 34 so that the projection 34 is spaced from the wall 33. The inner circumference of the intermediate member 16 is provided with a second projection 36 extending axially and to the right. A plurality of pins 41 extend through the projection 36 and engage cooperating blocks 42 sliding in suitable grooves formed in the stationary blade holder to provide for expansion of the stationary blade holder relative to the intermediate member 16. Formed on the right hand end of the intermediate member 16 and located between the tongue 34 and the projection 36 is a groove 37 mating with a tongue 38 formed on the inner casing end wall.

The left hand end of the intermediate member 16 connects the top and bottom half of the axially divided stationary blade holder 18 and includes a surface 46 which engages the outer circumference of the stationary blade holder 18 in the manner of a shrink ring. The shrink ring surface 46 of the intermediate member terminates in an annular shoulder 47 against which an annular shoulder 48 of the stationary blade holder is forced to abut by the thrust force of the working fluid acting from right to left and indicated by the arrows. Hence, the intermediate member is subject to the thrust force on the stationary blade holder. Note that the thrust force exerted on the intermediate member 16 would tend to displace the intermediate member 16 axially from right to left.

Movement of the intermediate member from right to left is restrained by a ring or securing means 50 provided with male threads 50a, on the outer circumference, which are constructed to mate and cooperate with the female threads 31a provided on the inner circumference of the inner casing. The ring 50 is provided with a bearing surface 51 at the right hand end which contacts a bearing surface 52 on the left hand end of the intermediate member.

Referring to Figs. 2 through 7, the threads 50a and 31a of the ring 50 and the inner casing end portion 31, respectively, are shown in detail. In the preferred embodiment the intermediate member is stationary and the ring is rotatable relative thereto and also the thread is a right hand thread, that is, the ring 50 will advance from left to right as the ring is rotated clockwise.

As shown in Figs. 1, 6 and 7 the thread is constructed with a large degree of backlash by providing a space S between one half of the contiguous and homologous faces. That is, a clearance is provided between the right hand faces, as viewed in Fig. 1, of the threads on the ring and the left hand faces of the threads on the inner casing, when the ring is in position to secure the intermediate member in the working position.

The clearance is obtained by constructing the male threads 50a of the ring 50 of smaller axial dimension than the corresponding openings of the female threads 31a of the inner casing 31. When the ring is tightened the left hand end of the male threads, as viewed in Fig. 1, will be in contact with the left hand end of the mating opening. The tightening force is distributed over only one side of the thread and it is only necessary to turn the ring relative to the inner casing a very small angle in order to free the ring from the inner casing.

By providing the clearance S between the thread faces the ring 50 need be turned only a small angle before it will be free from the inner casing end portion 31. Hence, during the unscrewing of the ring the frictional resistance to turning must be overcome for a small angle only. Note that, if conventional threads had been used it would have been necessary to overcome the friction between thread faces during the entire unscrewing of the ring.

The threads on both ring and inner casing are divided into segments 60 by a plurality of grooves 61, 62, 63 and 64 disposed transversely of the threads. Each groove 61, 62, 63 or 64 is provided with longitudinally converging sides as hereinafter described. The grooves 61 and 63 on the ring are slightly deeper than the threads on the ring while the grooves 62 and 63 on the inner casing are slightly shallower.

The grooves 61, 62, 63 and 64 are constructed and arranged so that one pair of grooves, comprising the groove 61 formed on the ring and the groove 62 formed on the inner casing cooperate to define a first channel 65 (Figs. 4 and 6) extending transversely of the threads and a second pair of grooves, comprising the groove 63 formed on the ring and the groove 64 formed on the inner casing cooperate to define a second channel 66 (Figs. 5 and 7) similarly extending transversely of the threads.

The grooves 61, 62, 63 and 64 are proportioned and located as shown by Figs. 6 and 7, so that the relative position of the grooves which mate to form the hereinbefore mentioned channels is such that immediately prior to the last few degrees of relative movement between ring and inner casing, the relative position of the mating grooves in the first channel 65 is such that the ring or male threads extend beyond the casing or female thread on the left hand end and the casing or female thread extends beyond the ring or male thread on the right hand end, while on the adjacent channel 66 the threads of the ring extend beyond the casing thread on the right and the casing thread extends beyond the ring thread on the left.

Referring to Figs. 6 and 7, the grooves 61 and 62 which form the first channel 65 are constructed with the right hand end, as viewed in Fig. 6, parallel to the longitudinal axis of the turbine and the left hand end at an angle to the longitudinal axis of the turbine such that the groove converges from left to right when viewed as mounted on the turbine. The adjacent grooves 63 and 64 are constructed so that the left hand end is parallel to the longitudinal axis of the turbine and the right hand end, as viewed in Fig. 7, at an angle to the longitudinal axis of the turbine such that the groove converges from left to right when viewed as mounted in the turbine.

A suitable wedge 70 is provided for insertion into either channel 65 or 66. As previously stated, in the present embodiment the inner casing is a stationary element. When the wedge 70 is inserted in the channel 66 shown in Figs. 5 and 7 it will tend to displace the threads of the ring to the right or clockwise, resulting in a tightening of the ring. When it is desired to loosen the ring the wedge is inserted in the channel 65 shown in Figs. 4 and 6 which will tend to displace the ring thread to the left or counterclockwise.

Since the transverse grooves reduce the amount of threads, they consequently reduce the friction that must be overcome in unscrewing the ring. If desired, the grooves may be made slightly wider than the threaded portions, so that the latter can be inserted in the former and then turned to mesh, in the manner of a bayonet joint.

From the foregoing it is seen that a securing device for fixedly positioning the stationary blade component to the inner casing, utilizing a threaded ring screwed onto the inner casing with threads having sufficient backlash to facilitate assembly and disassembly has been provided. In addition, the threaded elements have been constructed with pairs of mating grooves constructed so that the threads of one member overlap those of the other member in such a manner that a wedge may be inserted into one pair of grooves to tighten the ring and into another pair of grooves to loosen the ring.

While the invention has been shown in but one form, it will be obvious to those skilled in the art that it is susceptible of various changes and modifications without departing from the spirit thereof.

What is claimed is:

1. A stationary blade component securing device comprising a casing, a stationary blade component positioned along the axial length of said casing, a restraining means provided on said casing at one side of said component whereby axial movement of said component is restrained in one direction, said casing being provided with an axially extending end portion encompassing said stationary blade component and extending axially beyond said stationary blade component, said portion which extends beyond said stationary blade component being provided with female threads on the inner circumference, a ring provided with male threads on the outer circumference mating with said female threads, said ring bearing against and restraining axial movement of said stationary blade component in the direction opposite to that restrained by said restraining means, said threads on both said casing and said ring being provided with a plurality of pairs of mating grooves extending transversely of said threads having longitudinally converging sides; a first pair of grooves having said male threads projecting beyond the female threads on one longitudinal side and the female threads projecting beyond the male threads on the other longitudinal side and a second pair of grooves wherein the male and female threads project on sides opposite from the first pair, whereby upon insertion of a wedge into the first pair of grooves movement of the ring in one direction is effected and upon insertion of a wedge into the second pair of grooves movement of the ring in the opposite direction is effected.

2. A mounting means for use in an elastic fluid turbine comprising an axially undivided casing having a body portion and an axially extending end portion, said end portion being provided with female threads on the inner circumference spaced from said body portion, said body portion being provided with an inwardly extending annular wall having an annular groove and an annular tongue, a stationary blade component disposed between said body portion of said casing and said threaded part of said end portion, said stationary blade component being provided with a second annular tongue mating with said first annular groove and also provided with a second annular groove mating with said first annular tongue, said first mentioned tongue abutting the end wall of said second mentioned groove and said second mentioned tongue being spaced from the end wall of said first mentioned groove, a ring provided with male threads on the outer circumference and constructed to mate with said female threads, and said ring bearing against said stationary blade component and fixedly securing said blade component between said ring and said first mentioned tongue.

3. A mounting means for use in an elastic fluid turbine comprising an axially undivided casing having a body portion and an axially extending end portion, said end portion being provided with female threads on the inner circumference spaced from said body portion, said body portion being provided with an inwardly extending annular wall having an annular groove and an annular tongue, a stationary blade component disposed between said body portion of said casing and said threaded part of said end portion, said stationary blade component being provided with a second annular tongue mating with said first annular groove and also provided with a second annular groove mating with said first annular tongue, said first-mentioned tongue abutting the end wall of said second-mentioned groove and said second-mentioned tongue being spaced from the end wall of said first-mentioned groove, a ring provided with male threads on the outer circumference and constructed to mate with said female threads, said ring bearing against said stationary blade component and fixedly securing said blade component between said ring and said first-mentioned tongue, said threads on both casing and ring having a plurality of pairs of mating grooves extending transversely of said threads and longitudinally converging sides, a first pair of grooves having said male threads projecting beyond the female threads on one longitudinal side and the female threads projecting beyond the male threads on the other longitudinal side and a second pair of grooves wherein the male and female threads project on sides opposite from the first pair, whereby upon insertion of a wedge into the first pair of grooves movement of the ring in one direction is effected and upon insertion of a wedge into the second pair of grooves movement of the ring in the opposite direction is effected.

4. A stationary blade component securing device comprising a casing, a stationary blade component, a restraining means provided on said casing whereby movement of said component is restrained, said restraining means being provided with female threads, a securing means provided with male threads mating with said female threads, said threads being interrupted by a plurality of grooves extending transversely of said threads, said grooves being so disposed that a first groove of said restraining means cooperates with a second groove of said securing means and together therewith defines a channel, said grooves of said channel being so spaced and arranged with respect to one another that said male threads project beyond said female threads on one longitudinal side and said female threads project beyond said male threads on the other longitudinal side and said grooves being adapted for effecting movement of said securing means relative to said restraining means.

5. A stationary blade component securing device comprising a casing, a stationary blade component positioned along the axial length of said casing, a restraining means provided on said casing at one side of said component whereby axial movement of said component is restrained in one direction, said casing being provided with an axially extending end portion encompassing said stationary blade component and extending axially beyond said stationary blade component, said portion which extends beyond said stationary blade component being provided with female threads on the inner circumference, a ring provided with male threads on the outer circumference mating with said female threads, said ring bearing against and restraining axial movement of said stationary blade component in the direction opposite to that restrained in said restraining means, said threads being interrupted by a plurality of grooves extending transversely of said threads, said grooves being so disposed that a first groove of said restraining means cooperates with a second groove of said ring and together therewith defines a channel, said grooves of said channel being so spaced and arranged with respect to one another that said male threads project beyond said female threads on one longitudinal side and said female threads project beyond said male threads on the other longitudinal side, said grooves being adapted for effecting movement of said ring relative to said restraining means, and each of said grooves having longitudinally converging sides, whereby upon insertion of a wedge into said channel relative movement between said ring and said restraining means is effected.

6. A mounting means for use in an elastic fluid turbine comprising an axially undivided casing having a body portion and an axially extending end portion, said end portion being provided with female threads on the inner circumference spaced from said body portion, said body portion being provided with an inwardly extending annular wall having an annular groove and an annular tongue, a stationary blade component disposed between said body portion of said casing and said threaded part of said end portion, said stationary blade component being provided with a second annular tongue mating with said first annular groove and also provided with a second annular groove mating with said first annular tongue, said first-mentioned tongue abutting the end wall of said second-mentioned groove and said second-mentioned tongue being spaced from the end wall of said first-mentioned groove, a ring provided with male threads on the outer circumference and constructed to mate with said female threads, and said ring bearing against said stationary blade component and fixedly securing said blade component between said ring and said first-mentioned tongue, said threads being interrupted by a plurality of grooves extending transversely of said threads, said grooves being so disposed that a first groove of said end portion cooperates with a second groove of said ring and together therewith defines a channel, said grooves of said channel being so spaced and arranged with respect to one another that the male threads project beyond the female threads on one longitudinal side and the female threads project beyond the male threads on the other longitudinal side and said grooves being adapted for effecting movement of said ring relative to said end portion.

References Cited in the file of this patent

UNITED STATES PATENTS

| Number | Name | Date |
|---|---|---|
| 973,472 | Broadbent | Oct. 25, 1910 |
| 974,108 | Bell | Nov. 1, 1910 |
| 1,736,818 | Aumack | Nov. 26, 1929 |
| 1,843,113 | Dunlap | Feb. 2, 1932 |